2,714,125

PREPARATION OF 2,4,5-TRICHLORBENZYL-CHLORIDE

Fritz Gerner, Ingelheim-Mitte, Germany, assignor to the firm "C. H. Boehringer Sohn," Ingelheim am Rhein, Germany, a partnership No Drawing. Application April 10, 1951,
Serial No. 220,359

Claims priority, application Germany April 20, 1950

5 Claims. (Cl. 260—651)

This invention is concerned with improvements in or relating to the preparation of 2,4,5-trichlorbenzene and a principal object of the invention is to provide a process for the introduction of the chloromethyl group into 1,2,4-trichlorbenzene.

It is known that 2,4,5-trichlorbenzylchloride is a valuable intermediate, e. g. for the production of 2,4,5-trichlorphenylacetic acid, which is of interest as a weed-killer and for fungicidal preparations. In the usual production of the said compound one starts with benzyl chloride, which is subjected to a nuclear chlorination. This however results in a mixture of different isomeric and homologous chloro-compounds, from which the 2,4,5-trichlorbenzyl chloride can only be separated with difficulty.

It seemed obvious to obtain 2,4,5-trichlorbenzylchloride by introducing a chloromethyl group into 1,2,4-trichlorbenzene. There are, indeed, numerous processes for the introduction of the chloromethyl group into similar substances, e. g. by means of chloromethyl ether and stannous chloride or by means of formaldehyde and concentrated hydrochloric acid. According to one known process, the chloromethyl group is introduced into aromatic hydrocarbons which have negative substituents by allowing sulphuric acid to act on a mixture of hydrocarbons with paraformaldehyde or trioxymethylene and common salt. However none of these processes enable 1,2,4-trichlorbenzene to be chloromethylated.

Japanese patent specification 162,726 describes a process for the introduction of the chloromethyl group into 4-nitrotoluene, in which bis-chloromethyl ether

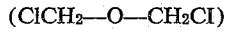
(ClCH₂—O—CH₂Cl)

in fuming sulphuric acid is used. By splitting off water the corresponding chloromethyl compound results, which compound can however also be obtained by another method.

It has now been found that 1,2,4-trichlorbenzene can be converted, under relatively mild conditions, into 2,4,5-trichlorbenzyl chloride if it is reacted in an excess of fuming sulphuric acid with chloromethyl ether.

According to the invention therefore we provide a process for the preparation of 2,4,5-trichlorbenzyl chloride in which 1,2,4-trichlorbenzene is reacted with chloromethylether in an excess of fuming sulphuric acid at moderate temperatures.

It is possible to operate with a 2–10 fold excess over the molar proportion, but an excess of from 5–7 mols has been found to be preferable. The reaction takes place at moderate temperatures and with the splitting off of methyl alcohol. The reaction may take place at a temperature range of from $-20$ to $+40°$ C. but a temperature range of from $-5$ to $+20°$ C. is especially advantageous. The yield obtainable depends on the amount of free sulphur trioxide contained in the fuming sulphuric acid. The sulphur trioxide concentration of the monohydrate is sufficient for carrying out the process according to the invention, whilst concentrations of more than 10% of sulphur trioxide offer no advantage.

In order that the invention may be well understood the following example is given only as an illustration:

Firstly 97 parts by weight of chloromethyl ether and then 180 parts by weight of 1,2,4-trichlorbenzene are added dropwise, with vigorous stirring to 640 parts by weight of oleum (sp. g. 1,865) at 0° C. The mixture is then maintained at 0° C. for a further hour and the temperature is then allowed slowly to rise to room temperature, stirring being continued overnight. Thereupon the reaction mixture is poured onto 1500 parts by weight of ice, and is extracted three times with chloroform. The lower layer is separated, dried over calcium chloride, the chloroform is driven off, and the residue is subjected to vacuum distillation. The greater part distills at 12 mm. between 140°–145° C. (yield 70%).

What I claim is:

1. A process for the preparation of 2,4,5-trichlorbenzylchloride in which first chloromethyl ether and then 1,2,4-trichlorobenzene is added dropwise to a 2 to 10 fold excess of fuming sulphuric acid, containing up to 10% of free sulphur trioxide at a temperature in the range of $-20°$ to $+40°$ C., stirring the mixture for a sufficient time to cause a reaction to take place, and separating the 2,4,5-trichlorbenzylchloride formed in said reaction.

2. A process for the preparation of 2,4,5-trichlorbenzylchloride in which first chloromethyl ether and then 1,2,4-trichlorobenzene is added dropwise to a 2 to 10 fold excess of fuming sulphuric acid, containing up to 10% of free sulphur trioxide, at about 0° C., stirring the mixture for a sufficient time to cause a reaction to take place, then allowing the temperature to rise to room temperature, pouring said mixture onto ice, extracting the reaction mixture with chloroform, and separating the 2,4,5-trichlorbenzylchloride formed in said reaction.

3. A process for the preparation of 2,4,5-trichlor-benzylchloride in which 1,2,4-trichlorbenzene is reacted with chloromethyl ether at temperatures in the range of $-20°$ to $+40°$ C. in a 2 to 10 fold excess of fuming sulphuric acid over the molar proportion, said fuming sulphuric acid containing up to 10% of free sulphur trioxide.

4. A process for the preparation of 2,4,5-trichlor-benzylchloride in which 1,2,4-trichlorbenzene is reacted with chloromethyl ether at temperatures in the range of $-20°$ to $+40°$ C. in a 5 to 7 fold excess of fuming sulphuric acid over the molar proportion, said fuming sulphuric acid containing up to 10% of free sulphur trioxide.

5. A process as claimed in claim 3 in which the temperature range is from $-5°$ to $+20°$ C.

References Cited in the file of this patent

Adams et al.: "Organic Reactions," vol. 1, pp. 66, 80 (1942).

Stephen et al.: "Jour. Chem. Soc.," 1920, page 522.